(12) United States Patent
Shima

(10) Patent No.: US 7,679,764 B2
(45) Date of Patent: Mar. 16, 2010

(54) SERVICE CALL SYSTEM

(75) Inventor: Toshihiro Shima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1400 days.

(21) Appl. No.: 11/003,427

(22) Filed: Dec. 6, 2004

(65) Prior Publication Data

US 2005/0248805 A1  Nov. 10, 2005

(30) Foreign Application Priority Data

Dec. 25, 2003  (JP) .............................. 2003-428698

(51) Int. Cl.
*G06F 15/00* (2006.01)
*G03G 15/00* (2006.01)
(52) U.S. Cl. ..................................... 358/1.15; 358/1.14
(58) Field of Classification Search .................. 358/1.1, 358/1.9, 1.13, 1.15, 474, 448, 1.14; 709/201, 709/203, 211, 223; 707/203
See application file for complete search history.

(56) References Cited

U.S. PATENT DOCUMENTS 6,963,698 B2 * 11/2005 Kondo ............................ 399/8

7,099,779 B2 * 8/2006 Niki ............................ 702/33

FOREIGN PATENT DOCUMENTS

| JP | 05-318879 A | 12/1993 |
| JP | 08-025766 A | 1/1996 |
| JP | 2002-7703 A | 1/2002 |
| JP | 2002-196917 A | 7/2002 |
| JP | 2003-043867 A | 2/2003 |
| JP | 2003-162400 A | 6/2003 |
| JP | 2003-288196 A | 10/2003 |
| JP | 2003-319084 A | 11/2003 |

* cited by examiner

*Primary Examiner*—Gabriel I Garcia
(74) *Attorney, Agent, or Firm*—Sughrue Mion, PLLC

(57) ABSTRACT

On the printer PRT, there is a service call button installed on an operating panel 200 for notifying the management system 100 of a repair request when an error occurs that is difficult for the printer itself to detect, such as when during printing processing, work-up of the back surface, or missing dots occur. When it receives notice that the service call button has been pressed, the management system 100 creates a web page 500 that displays the input screen for inputting the details of the error contents, notes the URL of the web page 500 on an e-mail 10 and sends this to the user. Information relating to the printer PRT such as the usage history, years of use, and model, etc. stored in the database DB are reflected in the web page 500. For example, error contents inference from the usage history are selectively displayed, or errors that occurred before the service call button was pressed are displayed.

10 Claims, 10 Drawing Sheets

Fig.2

| Printer ID | Generation Date and Time | Error Contents |
|---|---|---|
| F12345 | 2003/06/12 10:25:23 | Paper jam Tray 1 |
| G00236 | 2003/06/15 17:33:26 | Service call error E403 |

| ID | Status of Use | Example of Assumed Conditions |
|---|---|---|
| 001 | Toner years of use: 3 years 2 months | Scumming of print surface |
| 002 | Paper: Postcard<br>Layout: Both side printing<br>Paper feed method: Hand feed | Work-up of the back surface of the paper |
| 003 | Extremely thin paper or extremely thick paper is being used | A paper supply error (paper supplied diagonally, etc.) |

501 — https://svc.epson.com/inquiry?number=F12345

502

| Model name | LP-EP01 |
| --- | --- |
| Manufacturing no. (printer ID) | F12345 |
| Installation location | CCC Corp. Nagano Sales Office (○×City··· |
| Registered user | Taro Yamada |
| Mail address | taro@ccc.co.jp |

Current Status

503

| Error | Paper | | Ink | | | |
| --- | --- | --- | --- | --- | --- | --- |
| | Tray 1 | Tray 2 | Y | M | C | K |
| None | A3:○ | A4:× | 50% | 48% | 29% | 60% |

Error History

504

2003/07/05　Paper jam Tray 1
2003/06/30　Paper jam Tray 1

Error Report Space

505 — When an error occurs, select from the following, or when there is no suitable item in the choices, enter the printer status in the free input space, and press the send button.

506
- ☐ Scumming occurs
- ☑ Paper feed error occurred
- ☐ Work-up of back surface 506a Free Input Space

507

[Send] 508

SERVICE CALL SYSTEM

BACKGROUND OF THE INVENTION

1. Field of Technology

The present invention relates to a technology that manages a printing device via a network.

2. Description of the Related Art

In recent years, there has been a popularization of management systems that remotely manage a printing device via a network. In these management systems, a management device receives various types of information from a printing device via a network. The management device issues, for example, instructions to dispatch a service person to perform repairs, instructions to issue ink based on that information. The various types of information includes information that can be detected on the printing device side, for example operating information such as the status or remaining ink amount, error information that can be inference to some degree such as toner running out or paper jams, or information such as printing device failure information.

For failures with the printing device, errors for which detection is not possible include such as printing with a workup of background, the occurrence of missing dots, uneven halftones, dirtiness of the back surface. Even when a management system is used, when this kind of failure occurs, the user makes a phone call to the printing device manufacturer and explains the error conditions. Based on the explanation, the manufacturer explains way of use or dispatches a service person.

However, to identify the printing device model and status, the user had to explain such as the model number, device option status, installation location, and network address with using a telephone. It is also extremely complicated to explain the conditions of errors that cannot be detected such as those described above, and suitably explaining those conditions was also difficult. Typically, it is not possible for the user to directly convey the error condition report to the technician who is well-informed about the printing device, so it is difficult to convey this correctly, and there was the problem that it is difficult to decide immediately on how to have the user handle the problem.

SUMMARY OF THE INVENTION

The present invention was created considering the problems described above, and there is need to make notification and handling easy when undetectable errors occur with a printing device.

To solve at least part of the problems described above, a first aspect of the invention provides a method of managing a printing device via a network that connects a printing device and a management system that manages the printing device. The method comprises at the printing device side: sending information relating to the usage status of the printing device to the management system from the printing device; detecting a predetermined operation on the printing device; notifying the management system of a specified notification that includes printing device identification information when the predetermined operation is detected, wherein the printing device identification information is information to identify the printing device;

the method comprises at the management system side: storing the information sent from the printing device to an information storage unit; extracting information relating to the printing device from the stored information based on the printing device identification information, and performing predetermined processing in relation to the specified notification based on the extracted information.

By working in this way, when the management system receives a specified notification from the printing device, and can perform for the user a handling that reflects the various pieces of information relating to the usage status the printing device that has been accumulated. Specifically, it is possible to do appropriate handling without the user having to give a detailed explanation of the conditions that have occurred with the printing device, thus improving convenience.

In the first aspect of the invention, printing device management information that includes the model of the printing device which has been correlated with the printed device identification information and at least part of the printing device usage history and failure history may be stored in the information storage unit.

In the first aspect of the invention, the predetermined processing in relation to the specified notification may be executed by creating reply information in relation to the specified notification based on the extracted information and sending the reply information to a specified transmission destination.

If reply information is created and sent as a reply in this way, it is possible to confirm that the specified notification was received by the management system. Also, by noting the printing device model or use history, etc. in the reply information, the user can confirm the current state of the printing device, thus improving convenience.

In the first aspect of the invention, the method may further comprises creating a failure inference information based on the extracted information, wherein the failure inference information indicates a failure being generated in the printing device; and wherein the sending the reply information is implemented by sending the reply information including the created failure inference information.

By working in this way, when it receives a specified notification from the printing device, the management system is able to inference the failure that has occurred with the printing device based on the accumulated information such as the use history and on the printing device model, etc., so there is no need for a detailed explanation from the user, making it easier to understand the printing device operating state and conditions, etc., thus improving convenience.

In the first aspect of the invention, the sending the reply information may be implemented by sending the reply information including an information for displaying the information relating to the printing device based on the extracted information and an input screen for inputting maintenance requests to the printing device.

By working in this way, the user does not need to again input various pieces of information relating to the printing device, so it is possible to lighten the load of the user. Also, the user can easily and in detail confirm the use status and inference failure information up to the present, which improves convenience.

In the first aspect of the invention, the method may further comprises notifying the specified notification when an operating unit of the printing device is operated. By working in this way, the user is able to easily perform the specified notification, thus improving convenience.

In the first aspect of the invention, the printing device comprises a display unit, the method may further comprising sending information to be displayed on the display unit. By working in this way, the user is able to confirm the fact that use of a printing device is not possible, the reason for this, and the scheduled repair date, thus improving convenience.

In the first aspect of the invention, the method may further comprises displaying a transmission status of the specified information in relation to the management system. By working in this way, it is optimal for the user to be able to understand the operating status such as the printing device processing status or if the management system is being accessed by operating the operating unit.

A second aspect of the invention provides a method of managing a printing device. The second aspect of the invention comprises sending specified information relating to the usage status of the printing device to a management system; sending to the management system specified notifications other than the specified information, wherein the notification includes printing device identification information that identifies the printing device; detecting operations in relation to an operating unit; and notifying the management system of a specified notification when the detection is made.

A third aspect of the invention provides a method of managing a printing device via a network. The third aspect of the invention comprises storing information that is transmitted from the printing device; receiving a specified notification, wherein the specified notification includes printing device identification information that identifies the printing device; extracting information correlating to the printing device identification information from the stored information; and performing a specified process in relation to the specified notification based on the extracted information.

The present invention can be used with suitable combining or omitting of parts of the various modes described above. For example, when a printing device equipped with an operating unit for notifying specified notifications described above receives the specified notification, it is possible to form this as a printing device management system that performs a specified process, a printing device management method, a computer program for having the printing device managed by the managing system, and a recording medium that can be read by a computer on which is recorded this computer program. For either structure, each of the modes described above can be suitably used. As recording media that can be read by a computer, it is possible to use various media such as flexible disks, CD-ROMs, DVD-ROMs, photo magnetic disks, IC cards, and hard disks, etc.

BRIEF DESCRIPTION OF THE DRAWINGS

FIG. 2 is an example of the information that is stored in the database of the embodiment;

FIG. 5 is an explanatory diagram that shows an example of the failure inference information of the embodiment;

FIG. 10 is an explanatory diagram that shows an example of a web page of the embodiment.

DETAILED DESCRIPTION OF THE PREFERRED EMBODIMENTS

Following, we will explain the embodiments of the present invention based on embodiments.

Figure 1:
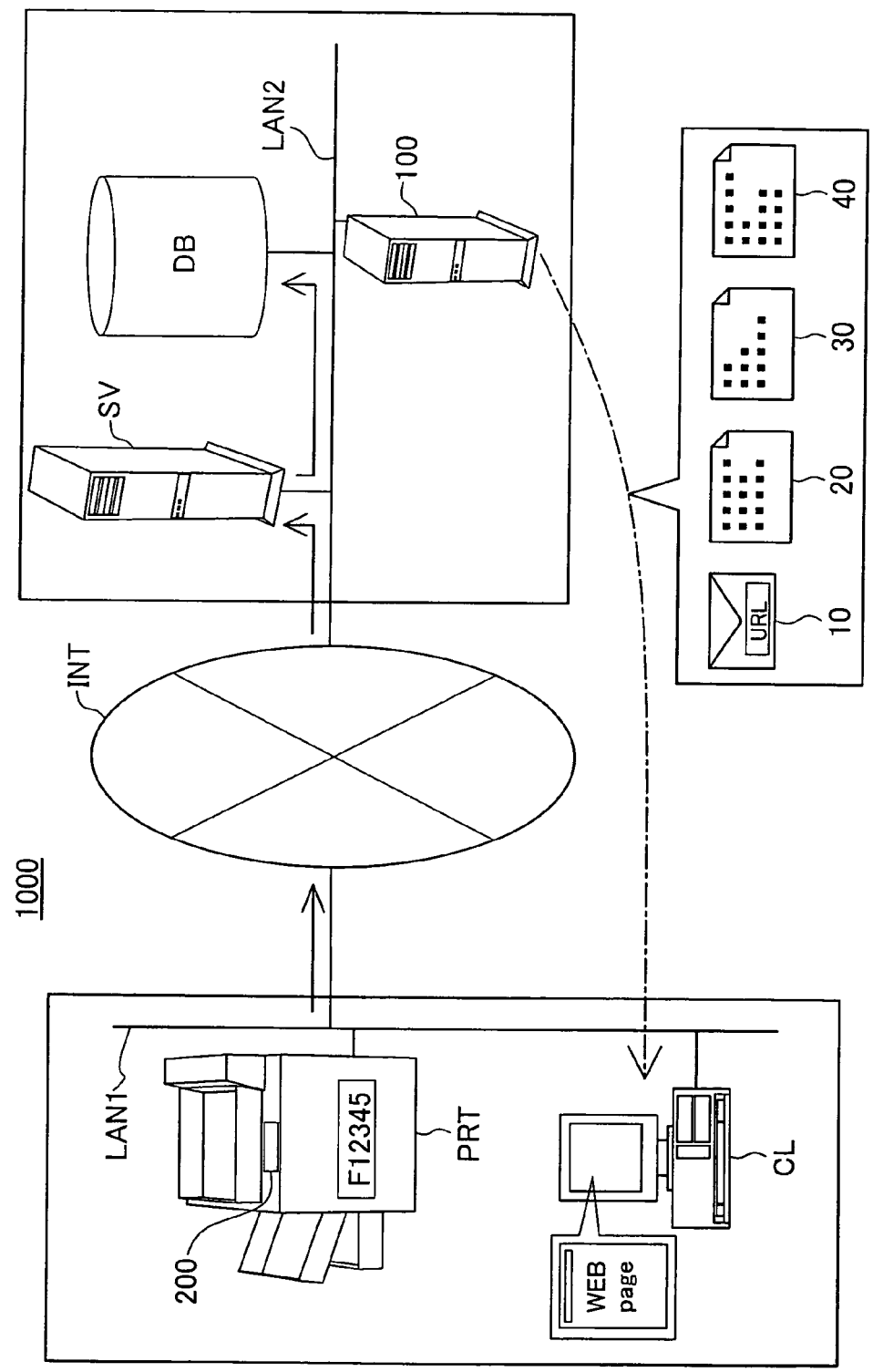
FIG. 1 is an explanatory diagram that shows an example of the system overview for the embodiment.

A1. System Summary:

FIG. 1 is an explanatory figure that shows an example of a system overview for this embodiment. In a service call system 1000, a local area network LAN1 and a local area network LAN2 are connected via the internet INT. A printer PRT used by the user is connected to the local area network. A management server 100 is connected to the local area network LAN2.

The printer PRT and a client CL are connected to the local area network LAN1. The client CL is a computer used by the administrator of the printer PRT. The printer PRT has a printer ID for uniquely identifying a plurality of printers set in advance. In this embodiment, the printer ID is set as printer manufacturing number "F12345." The printer PRT comprises a function that accumulates information that may be detected by the printer PRT such as error information, toner information, and use status for each job, combines these with the printer ID, and uploads these periodically to the receiving server SV.

The printer PRT comprises an operating panel 200. Installed on the operating panel 200 is a service call button for notifying a repair request to a management server 100 when an error that is difficult for the printer itself to detect, such as when during printing processing, the back surface is dirty, missing dots occur, or the paper is not conveyed properly. The error contents such as the current printer operating status, and the scheduled repair date are displayed on the display of the operating panel 200. The detailed explanation of the operating panel 200 will be described later.

A receiving server SV, a database DB, and a management server 100 are connected to the local area network LAN2. The receiving server SV receives various information such as the errors described above from the printer PRT, and accumulates these information in the database DB. FIG. 2 shows the information accumulated in the database DB.

FIG. 2 shows the error history 50 that is accumulated in the database DB in this embodiment. The error history 50 is composed from the printer ID, the occurrence date and time, and the error contents, and it accumulates the information of errors that occurred with the printer managed by the management server 100. For example, the printer ID "F12345" shows that "Paper Jam Tray 1," in other words, "a paper jam occurred in tray 1," occurred on Jun. 12, 2003 at 10:25:23." Also, the printer ID "G00236" shows that "Service call error E403" occurred on "Jun. 15, 2003 at 17:33:26." The error code 403 (E403) shows an error whereby a failure for which repair is required has occurred.

Returning to FIG. 1 and continuing the explanation. The management server 100 transmits an e-mail 10, a use report 20, a status report 30, and a repair request report 40 to the administrator of the printer PRT as indicated by the dot-dash line based on the various information accumulated in the database DB.

The e-mail 10 is an e-mail that confirms the transmission to the administrator of the printer PRT when the service call button that is installed in the operating panel 200 of the printer 200 is pressed. When the management server 100 receives notification that the service call button has been pressed, a web page is created that displays an input screen for having the user input the detailed error contents, the URL of this web page is noted in the e-mail 10, and this is transmitted. Information relating to the printer PRT such as the use history, years of use, and model are reflected in the web page, and displayed in advance. Also, for example, error contents inference from the use history are selectively displayed, and errors that occurred near the time that the service call button was pressed are displayed. This e-mail 10 will be described later.

Figure 3A:
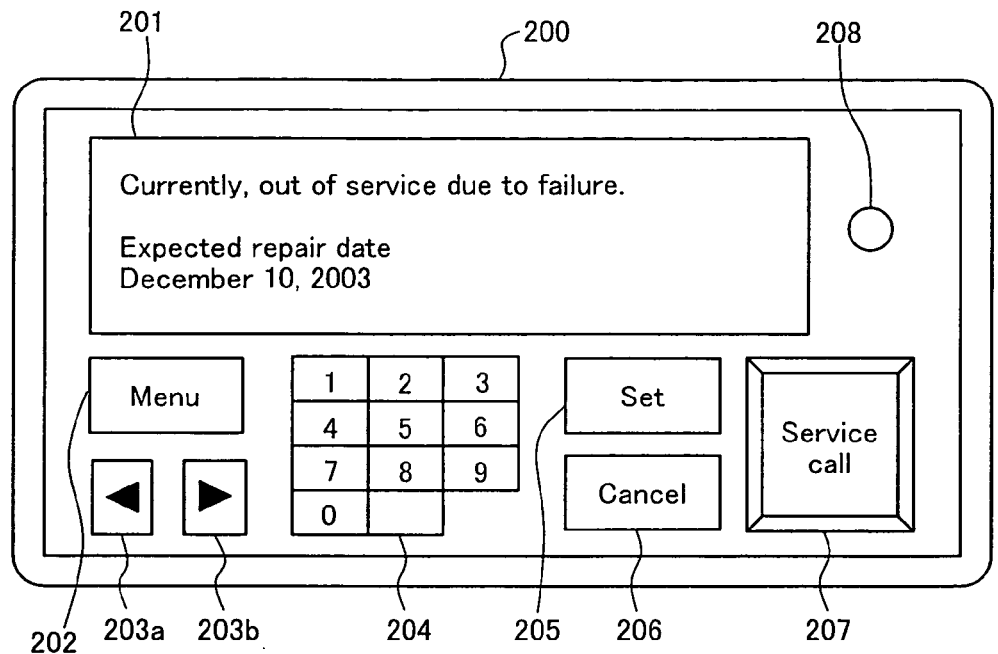
FIGS. 3a and 3b are explanatory diagrams that show examples of the printer function of the embodiment.

A2. Printer Function Block:

FIG. 3 is an explanatory figure that explains the printer PRT of this embodiment. FIG. 3(a) shows an explanatory figure that shows an example of the operating panel 200.

The display 201 displays, for example, the current printer operating state, status, and scheduled repair date.

The service call button 207 is pressed by the user when an error occurs that is difficult for the printer itself to detect such as when, during printing processing, the back surface becomes dirty, missing dots occur, or the paper is not conveyed properly. When the printer PRT detects that the service call button 207 is pressed, the printer PRT notifies the management server 100 that the service call button 207 has been pressed. The operating notice lamp 208 consists of an LED, and during normal operation, is lit with a green color. When the service call button 207 is pressed, and communication is performed to the management server 100, the light is lit red, and when uploading information such as information of errors that can be detected by the printer PRT, tone information, use status for each job to the receiving server SV, this is lit yellow. It is also possible to have the operating notice lamp 208 consist of a single color, with it lit, blinking slowly or blinking quickly according to operating status. By working in this way, it is easy for the user to understand things such as that the service call button 207 is pressed, or that information is being uploaded, which is optimal. When displaying on the display 201 information such as that uploading is occurring, the operating notice lamp 208 may be omitted.

A menu button 202, an item shift button 203a, 203b, number key buttons 204, a setting button 205, and a cancel button 206 are buttons for making various settings during printing processing, but since they are not used with this Embodiment, an explanation for these is omitted.

Figure 3B:
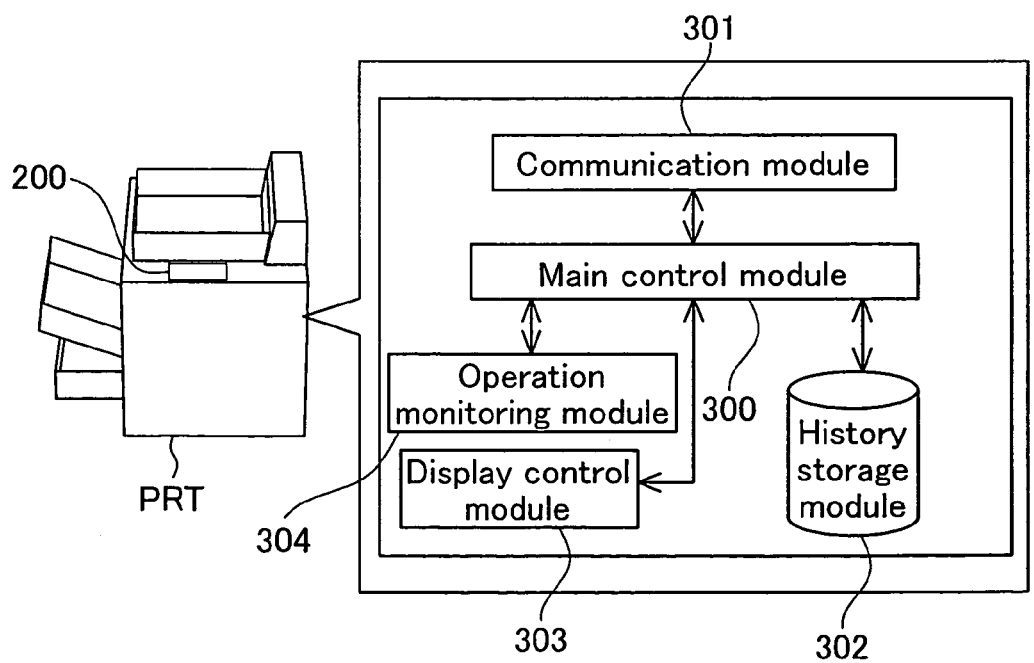

FIG. 3(b) is an explanatory figure that shows an example of the function block of the printer PRT of this embodiment. This function block is formed by software, and is controlled by the main control unit 300. It is also possible to form the function block using hardware.

The function block of the printer PRT is formed from the main control unit 300, the communication unit 301, the history storage unit 302, the display control unit 303, and the operation monitoring unit 304. The communication unit 301 has the function of performing communication with other devices that are connected to the local area network LAN1 and the internet INT. It is a so-called network device.

The operating monitoring unit 304 monitors, for example, the printer PRT status, error occurrence, use status for each user, and pressing of the service call button 207, and these pieces of information are stored in the history storage unit 302. The operating monitoring unit 304 immediately gives notice to the receiving server SV when the service call button 207 is pressed or when an error with a high level of importance has occurred. Also, the operating monitoring unit 304 notifies the receiving server SV of the information stored in the history storage unit 302 other than these pieces of information, with these consolidated and notified at a periodic reporting time.

The display control unit 303 comprises a function that displays on the display 201 the printer PRT status or the information notified from the management server 100 as shown in FIG. 3(a).

Figure 4:
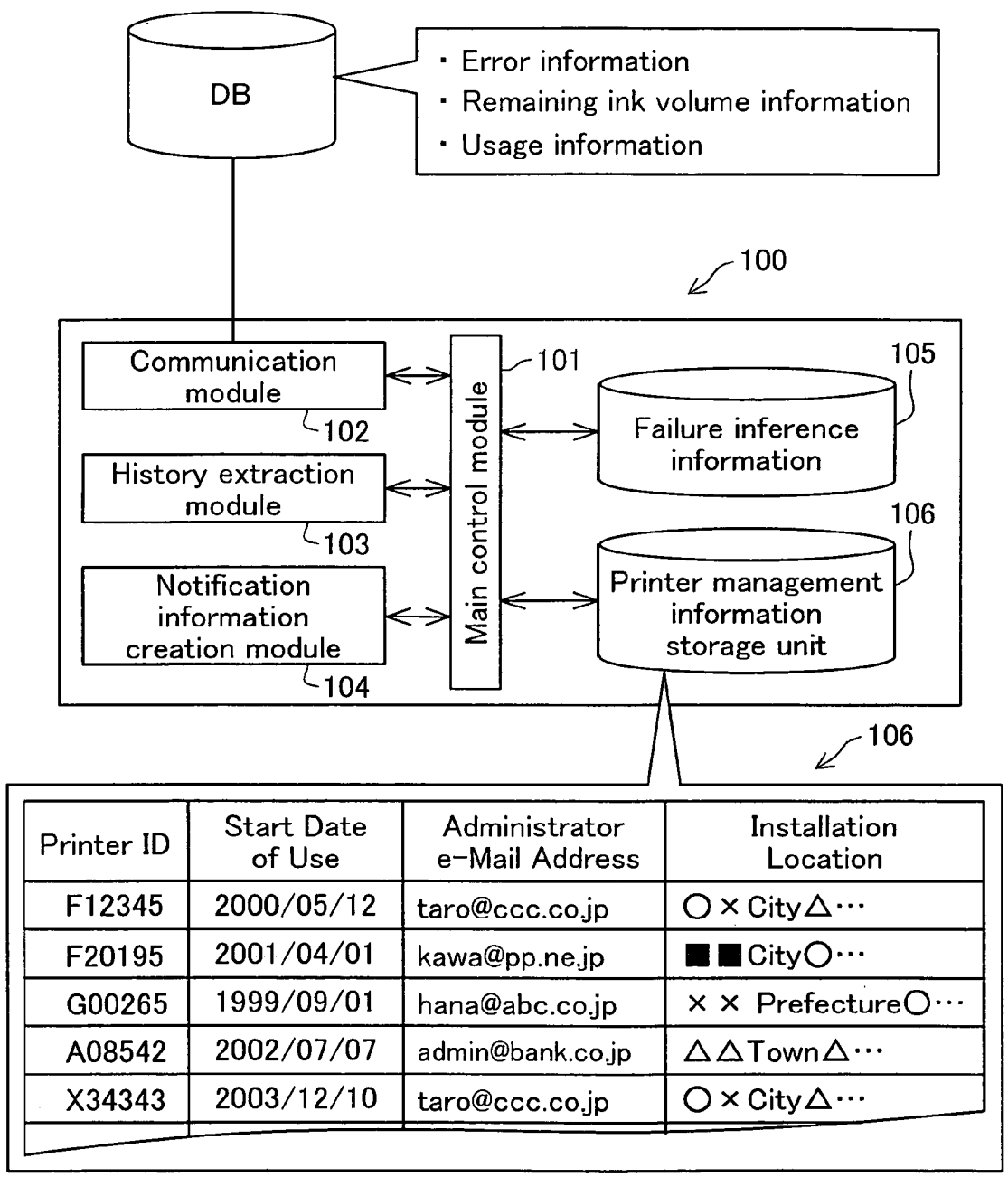
FIG. 4 is an explanatory diagram that shows an example of the function block of the management device of the embodiment.

A3. Management System Function Block:

FIG. 4 is an explanatory figure that shows an example of a function block of the management server 100 for this embodiment. The management server 100 consists of the main control unit 101, the communication unit 102, the history extraction unit 103, the notification information creation unit 104, the failure inference information 105, and the printer management information storage unit 106. Each function block is formed using software, and is controlled by the main control unit 101. It is also possible to form each function block using hardware. Also, stored in the database DB that is connected to the local area network LAN2 are error information, ink remaining volume information, and use history such as the use information for each user, etc. received from the printer PRT.

The communication unit 102 is a so-called network device, and has the function of performing communication with other devices via the local area network LAN2 or the internet INT. The printer management information storage unit 106 stores management information of the printer subject to management. The contents of the printer management information storage unit 106 are shown together in the figure. The printer management information storage unit 106 consists of four items, including a printer ID, the use start date, the administrator e-mail address, and the installation location. As described previously, the printer ID shows the printer manufacturer number, and is used to identify each printer. The use start date shows the use start date for each printer. The administrator e-mail address shows the contact address of the administrator on the user side for each printer, and the installation location shows the address at which each printer is installed. For example, the printer ID "F12345" had use started from "May 12, 2000." The email address of the administrator managing this printer is "taro@ccc.co.jp", and the installation location is shown as "Ox City Δ. . . " With this embodiment, the information stored in the printer management information storage unit 106 was input to the printer by the service person, etc. who performed installation at the time the printer was installed, and when printer use started, was accumulated in the printer management information storage unit 106 via the receiving server SV. For example, it is also possible to have this input separately based on information from the user registration site or a postcard, etc.

The history extraction unit 103 has a function such that when it receives notice that the service call button 207 of the printer PRT is pressed, it references the database DB and the printer management information storage unit 106, extracts information relating to the printer PRT, and transfers this to the notification information creation unit 104. The notification information creation unit 104 creates an email to be notified to the administrator of the printer PRT based on the contents received from the history extraction unit 103 and the failure inference information 105 and notifies this.

The failure inference information 105 stores error information and use history stored in the database DB and printer failure information inference from the printer management information storage unit 106. FIG. 5 shows an example of the contents of the failure inference information 105. Failure inference information is a series of information for identifying the contents of the failure inference from the accumulated information such as the use history. For example, it is possible to use a format of having managing information for which the information of "work-up of the back surface" is correlated to "both side printing is used frequently." For failure inference information, it is also possible to manage not only failure inference from the use history and error history, but also failure inference from the printing device model and years of use.

FIG. 5 is an explanatory figure that shows an example of failure inference information for this embodiment. The failure inference information 105 consists of an "ID," "usage status," and "examples of assumed conditions." The "ID" is a number allocated individually to each failure inference information. The "usage status" shows the printer usage status derived from the database DB and the printer management information storage unit 106, and the "examples of assumed conditions" show printer error conditions assumed from the "usage status." For example, as shown with the ID "002," with a printer with the setting "Paper: Postcard, Layout: Both side printing, Paper feed method: Hand feed," this shows that it is inference that the error of "work-up of the back surface of the paper" has occurred.

Figure 6:
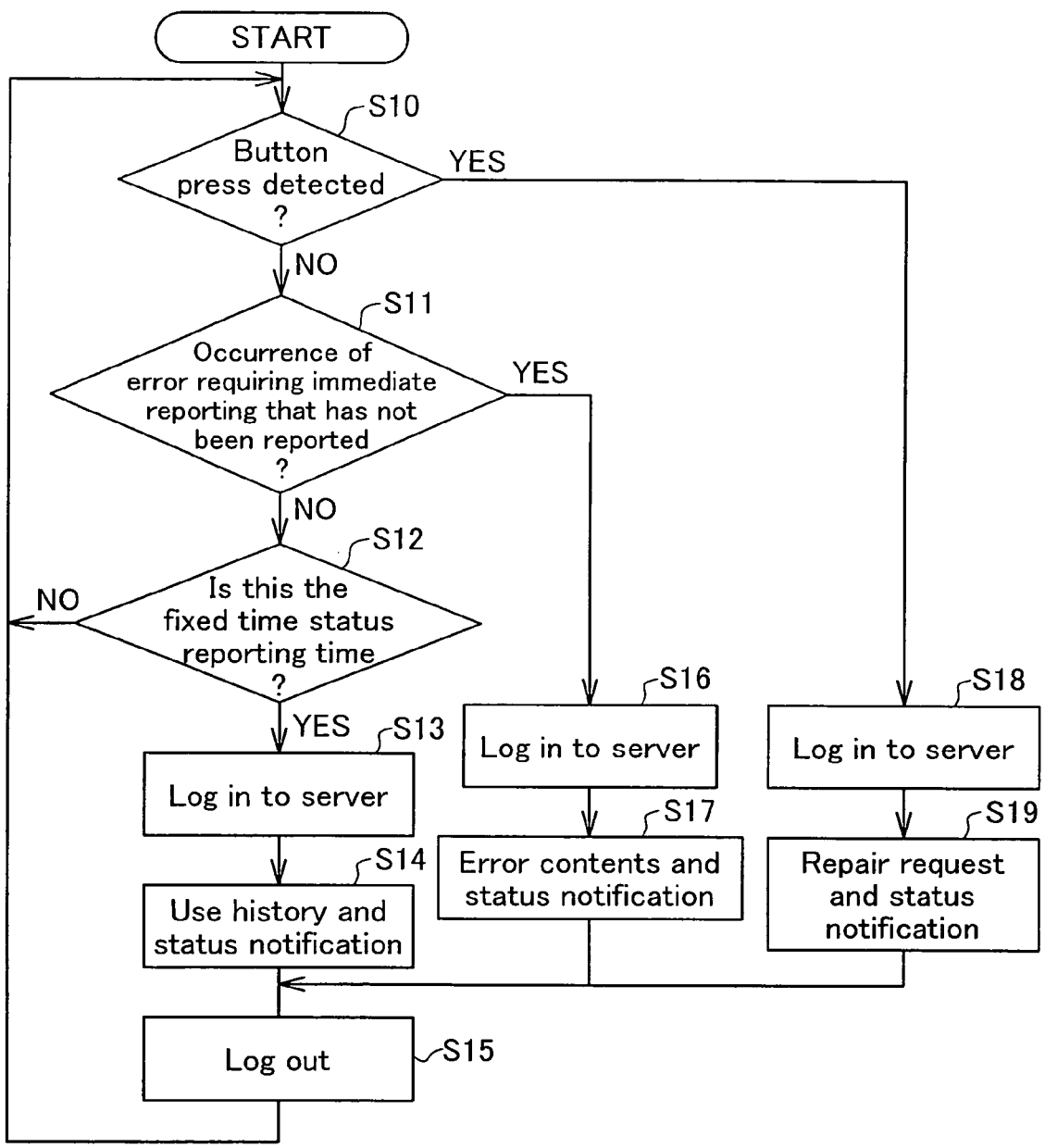
FIG. 6 is a flow chart that explains the process of giving notification to the server for the printer of the embodiment.

A4. Printer Side Notification Process:

FIG. 6 is a flow chart that explains the process of notifying the receiving server SV for the printer PRT for this embodiment. The printer PRT monitors the operating status of the printer process or error occurrence, and detects whether or not the service call button 207 has been pressed (step S10). When the service call button 207 is pressed (step S10: Yes), the printer PRT logs into the receiving server SV (step S18), makes a repair request, and gives notice of the current status such as online or offline (step S19). A user ID and password correlated to the printer ID are set in advance in the printer PRT, and the printer PRT uses these to log into the receiving server SV.

When the service call button 207 is pressed (step S10: No), the printer PRT continues monitoring, and when the printer PRT detects that an error has occurred that is unreported but requires immediate reporting (step S11: Yes), the printer PRT logs into the receiving server SV (step S16), and gives notice of the error contents and status (step S17). When there is not an error that has occurred and not been reported but requires immediate reporting (step S11: No), the printer PRT stores the error information and continues monitoring. When an error for which immediate reporting is not required occurs, the error information is stored, and monitoring continues.

Next, when the periodic status reporting time is reached (step S12: Yes), the printer PRT logs into the receiving server SV (step S13), gives notice of use history and status such as error information and use status, etc. (step S14), logs out (step S15), returns to step S10, and continues monitoring. When it is not the periodic status reporting time (step S12: No), monitoring continues.

Figure 7:
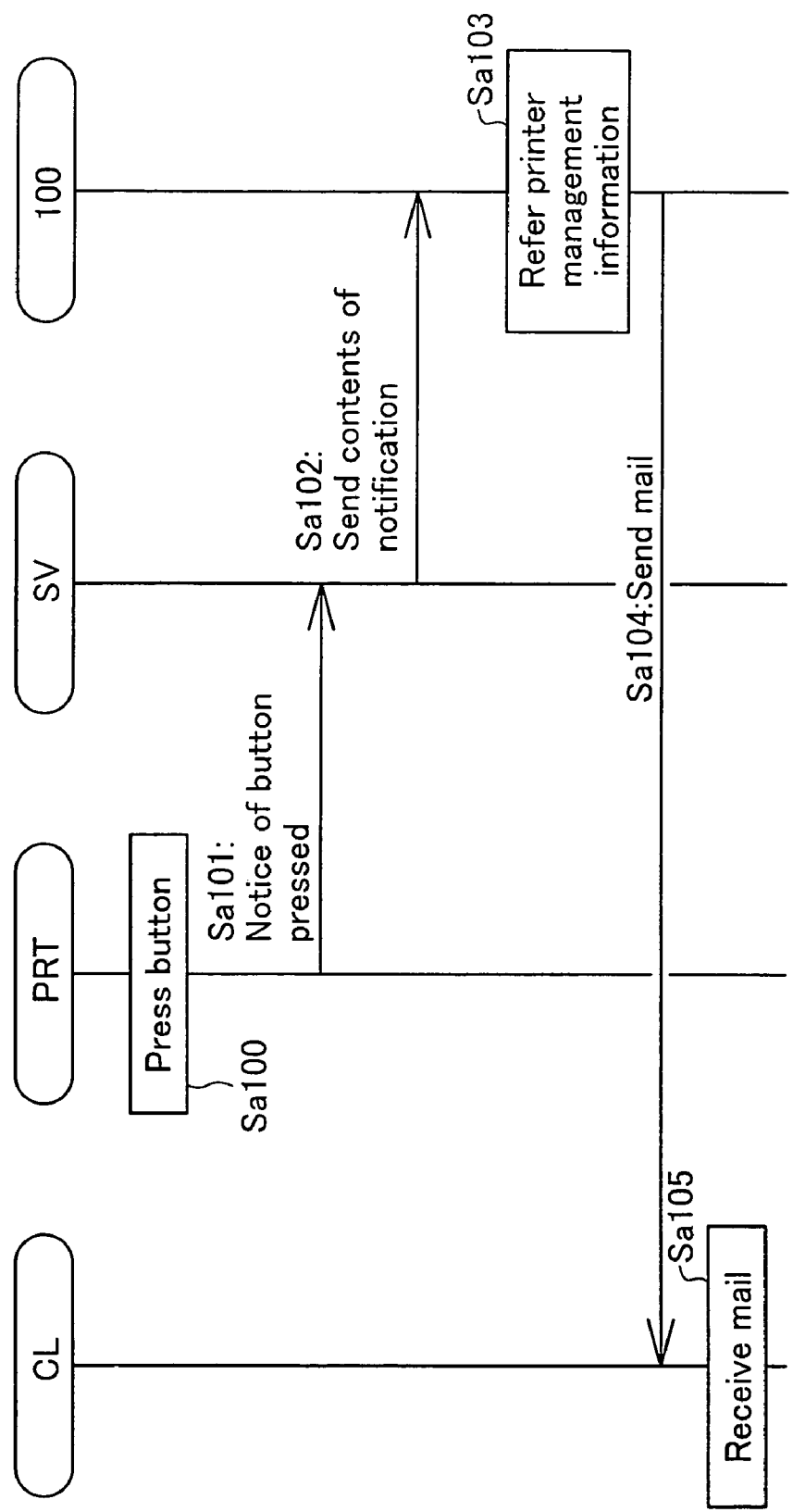
FIG. 7 is a flow chart that explains the e-mail transmission process for the embodiment.

A5. e-Mail Sending Process:

FIG. 7 is a flow chart that explains the e-mail transmission process for this embodiment. When it detects that the button is pressed (step Sa100), the printer PRT logs into the receiving server SV, and gives notice that the button is pressed (step Sa101). This notification includes the printer ID "F12345" that identifies the printer PRT.

The receiving server SV stores the fact that it received a notification in the database DB, and transmits the notification contents to the management server 100 (step Sa102).

Figure 8:
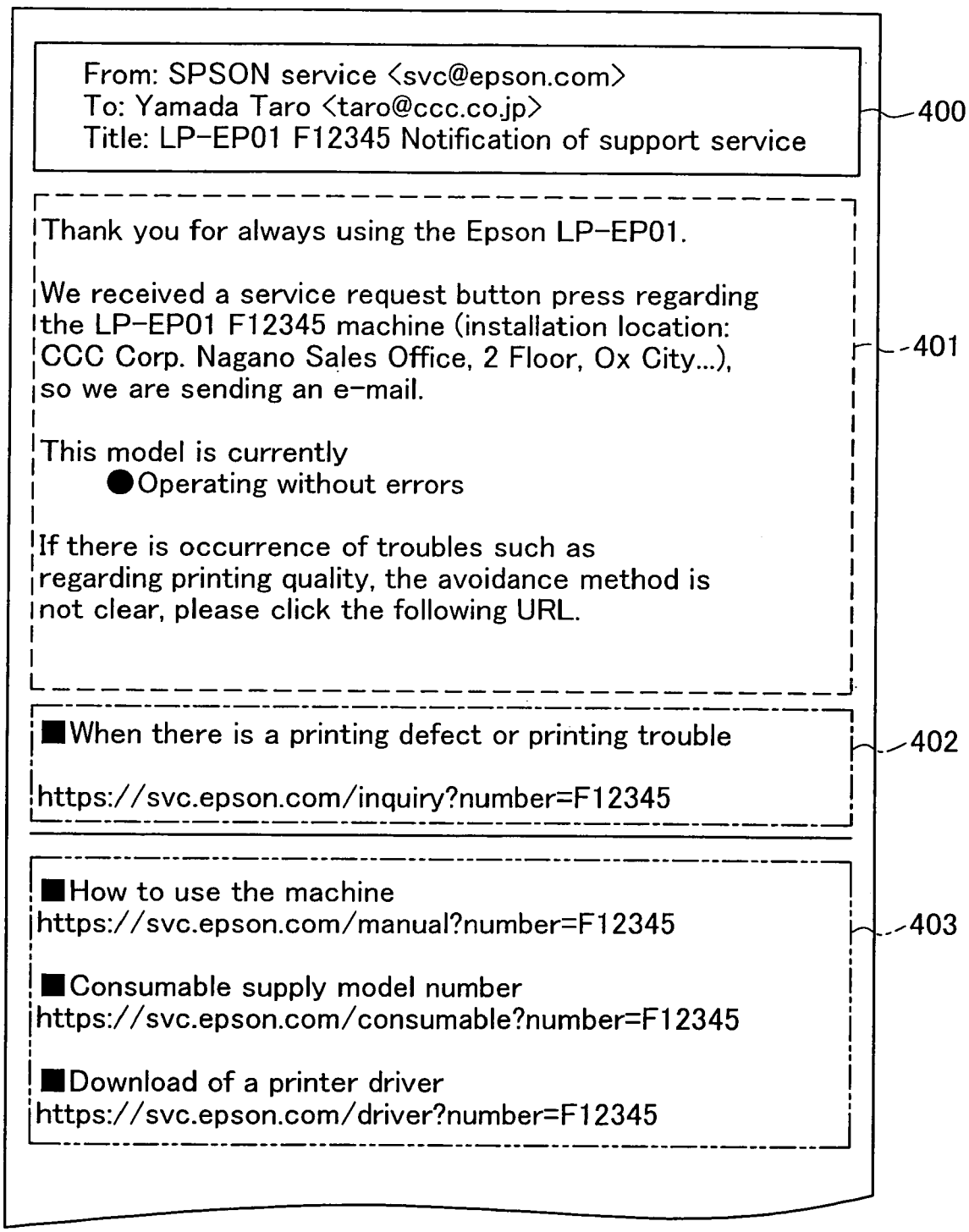
FIG. 8 is an explanatory diagram that shows an example of an e-mail of the embodiment.

The management server 100 references the printer management information storage unit 106 based on the printer ID contained in the received notification contents (step Sa103), and transmits the confirmation e-mail 10 in relation to the notification shown in Sa101 to the e-mail address of the administrator (step Sa104). The client CL receives this e-mail from the e-mail server (step Sa105). With this embodiment, we had the management server 100 send the e-mail, but it is also possible to have another device send the e-mail. FIG. 8 shows an example of the e-mail 10.

FIG. 8 is an explanatory figure that shows an example of the e-mail 10 of this embodiment. The e-mail 10 consists of a header 400, a message 401, a trouble correspondence link 402, and a general correspondence link 403. The header 400 is approximately the same as that of a typical e-mail, and consists of a sender, a receiver, and a title.

The message 401 is a confirmation message in relation to the pressing of the service call button 207. As shown by "LP-EP01 F12345," noted in the message 401 are a model name, a printer ID, and an installation location, and this is suitable because it allows the administrator to immediately understand which printer the e-mail is in relation to. Also, the current status is also noted at the same time as in, "Operating without error."

The trouble correspondence link 402 notes a URL that displays an input screen for having more detailed conditions input regarding an error that occurred with a printer when a printing defect or printing trouble such as "occurrence of scumming" or "work-up of paper back surface," etc. occurs. Noted in this URL is a printer ID that identifies the printer PRT as in, "HTTPS://SVC . . . number=F12345," and by clicking this, it is possible to browse a web page dedicated to the printer ID "F12345." We will later describe the details of the web page.

The general correspondence link 403 notes a URL to a web page that presents information other than the printing defect or printing trouble. As shown in the figure, for example, when the use method is not understood, a printer ID is noted as in, "HTTPS://SVC . . . consumable?number=F12345," and by clicking this, it is possible to browse a web page on which is noted a use method relating to the model of printer ID "F12345." By doing this, it is possible for the administrator to easily browse information such as the desired use method, which is desirable.

Figure 9:
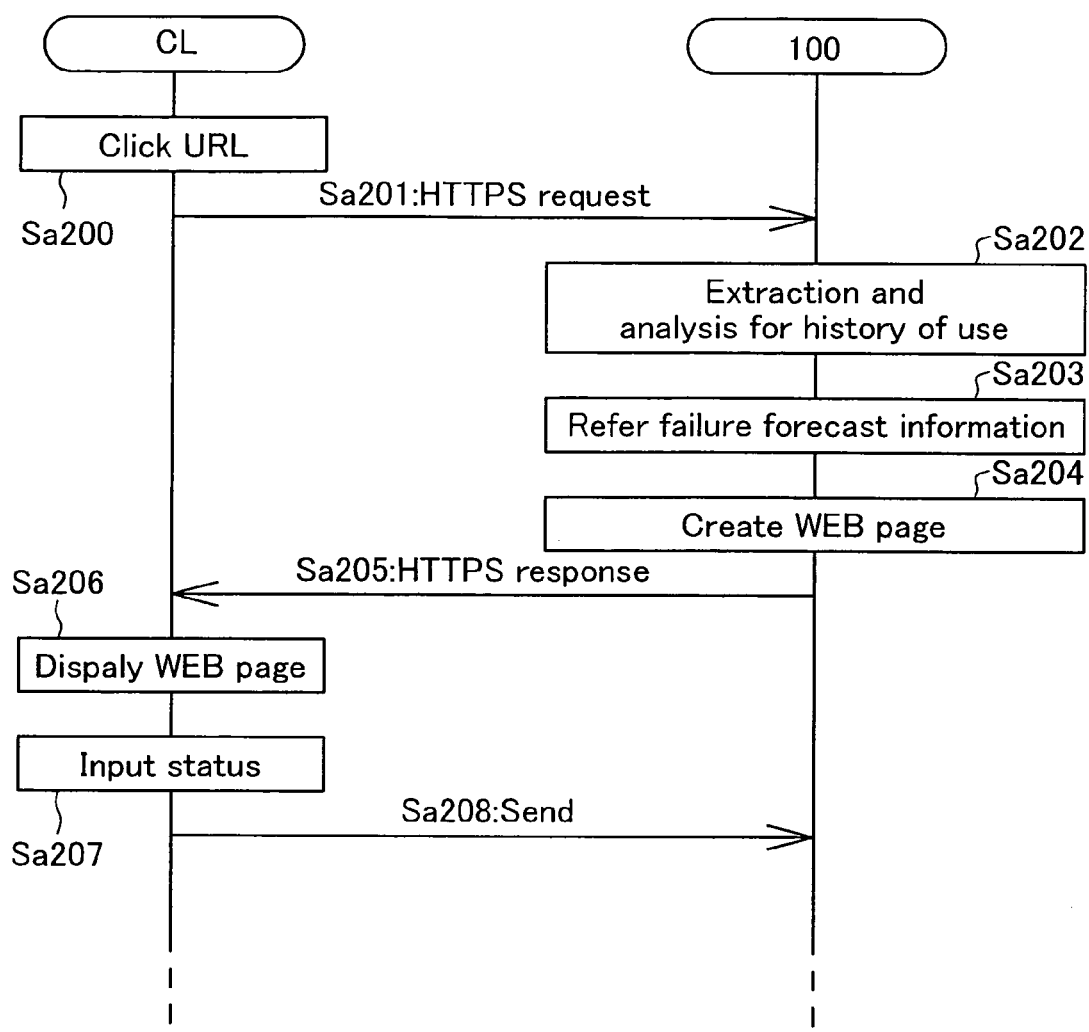
FIG. 9 is a flow chart that explains the web page display process of the embodiment.

A6. Web Page Information Creation Process:

FIG. 9 is a flow chart that explains the web page display process for this embodiment. This is the process that is subsequent to the step Sa16 of FIG. 7, and a process that is started by clicking the URL noted in the trouble corresponding link 402 of FIG. 8. With this embodiment, we had the management server 100 comprise an HTTPS server function, and we had the concerned process be executed by performing sending and receiving of information between the client CL and the management server 100, but it is also suitable to install an HTTPS server separately, because it is possible to lighten the processing load of the management server 100.

When the client CL detects a click of the URL noted in the trouble correspondence link 402 of the e-mail 10 (step Sa200), HTTPS access is performed in relation to the management server 100, and a request is made for the information of the concerned URL (step Sa201).

The management server 100 performs authentication for HTTPS access while also extracting printer management information such as the usage history relating to the concerned printer ID from the database and the years of use from the printer management information storage unit 106 based on the printer ID that is noted in the URL, and analyzes this (step Sa202), and next, the management server 100 references the failure inference information 105, and based on the extracted information, identifies the assumed (inference) conditions (step Sa203). Then, the management server 100, based on these usage history, printer management information, and assumed conditions, creates information to be displayed on a web page (step Sa204), and as an HTTPS response, replies to the client CL (step Sa205). Things such as the printer model name, etc. are preset in this information.

The client CL receives the HTTPS response and displays this on a web page (step Sa206). Based on the contents and explanation displayed in the web page, the status of the printer PRT is input (step Sa207), and a repair request is transmitted (step Sa208). FIG. 10 shows an explanatory figure that shows an example of a web page.

FIG. 10 is an explanatory figure that shows an example of a web page 500 for this embodiment. The URL that is noted in the e-mail 10 and clicked is input into the address bar 501, and the printer model name, the manufacturing number, the installation location, the registration user name, and the e-mail address are input in advance into the printer information 502, which makes it possible to omit the administrator having to make the effort to input these pieces of information again.

The currently occurring error information, remaining paper volume, remaining ink volume, etc. are input to the current status 503. These pieces of information are set based on the information that the management server 100 extracted from the database DB. As shown in the figure, for example, it shows "A4: X" for tray 2, in other words, that the A4 paper has run out for tray 2. The fact that the ink "Y", or "yellow" ink has 50% remaining is also shown.

The error history 504 displays a maximum of five error cases that occurred before the service call button 207 was pressed. With this embodiment, "Paper jam Tray 1," in other words, "the fact that a paper jam has occurred in tray 1 is shown in "Jul. 5, 2003" and "Jun. 30, 2003." It is also possible to have the display of the error history 504 display all the errors that have occurred in the 10 days before the service call button 207 was pressed, for example.

The message 505 is an operation guideline message. The condition selection unit 506 displays predicted conditions extracted from the failure inference information 105, and a check is placed in the corresponding condition checkbox 506a. The free input space 507 is a space for manually inputting conditions when there is not checkbox choice for the concerned condition.

After inputting at least one of the condition selection unit 506 and the free input space 507, the send button 508 is pressed and a repair request is transmitted. This transmission process is the process that correlates to step Sa208 in FIG. 9.

With the service call system 1000 of the embodiment explained above, even when an error occurs that is undetectable by the device itself for the printer PRT, by simply pressing the service call button 207 and performing an easy input operation according to the e-mail that is sent, it is possible to make a repair request without performing any complex actions such as printer identification, administrator input, or giving a detailed explanation of the concerned error conditions, thus improving convenience. For the repair request receiving side as well, this is suitable because it is possible to easily and surely understand the error conditions.

B Other Embodiments

Above, we explained embodiments of the present invention, but the present invention is not limited to this type of embodiment, and it is possible to implement a variety of embodiments within a scope that does not stray from its key points. For example, variation modifications such as the following are possible.

(1) With the embodiments described above, after the service call button 207 is pressed, we had things such as the error contents, the current printer operating status, and the scheduled repair date, etc. displayed on the operating panel 200 of the printer PRT, but it is not absolutely necessary to have this displayed. It is also possible to have these pieces of information printed rather than displayed.

(2) With the embodiments described above, a URL is noted in the e-mail 10, and by clicking this URL, we had a web page which allows input of the error conditions be displayed, but it is also possible to make a repair request by inputting the error conditions and transmitting these as the reply to the e-mail 10. It is also possible to note the predicted conditions in advance in the e-mail 10, and to select these and transmit them.

(3) The operating unit may also be, for example, a button or switch. for notification installed on the operating panel or network board. Regardless of the mode, the main concern is that it be an operating unit provided for sending the specified notification. Further, the operating unit, it is also possible to form this as a button that is placed on an operating panel of the printing device, for example. When an undetectable error occurs with the printing device itself such as faint printing, work-up of the back surface of the paper, missing dots occur, streaks appear in the paper feed direction, paper is fed diagonally, or a toner spill occurs, etc., it is also possible to have the user do some kind of operation on the operating unit so that the printing device is notified of what kind of error has occurred. Even with an error that is detectable by the printing device itself such as a paper jam, for example, it is possible to give notification when the user judges that the importance level of the occurring condition is high, such as one that occurs frequently.

(4) As information displayed on a display unit, it is possible to use, for example, the cause of failure, the current status of the printing device, whether use is possible, or the scheduled repair date. By working in this way, the user is able to confirm the fact that use of a printing device is not possible, the reason for this, and the scheduled repair date, thus improving convenience.

(5) As specified information relating to the usage status of the printing device, it is possible to use information on errors that occurred with the printing device, the ink dot count used during printing, the number of sheets of paper, and the paper size. Also, as printing device identification information, for example, the manufacturing number can be used, or a unique identification number or network address set for the printing device in advance may be used.

(6) Printing device management information may be things like the printing device model, use start date, and use date and year. By working in this way, it is possible to make use of failures that occur for each type of printing device, the wear status of the printing device assumed from the years of use, and the accumulated use history and failure history to assume the conditions and reasons for occurrences in the printing device, thus improving convenience.

(7) The specified processing can be various processes such as, for example, sending e-mail that reflects the error history or usage history, give instructions to dispatch a service person to do repairs, make telephone contact to the administrator of the printing device, or give instructions to replace resources such as the toner.

(8) Reply information may be, for example, an e-mail, or the contents printed on a printing device. In this reply information, it is possible to note, for example, extracted information such as the printing device model or use history, or to note a URL for displaying on a web browser the input screen for inputting the conditions that occurred in the printing device.

(9) As information included in the reply information, it is possible to use, for example, a URL for displaying an input screen on a web browser. As information related to the printing device, it is also possible to have displayed on the web browser in advance the printing device model and years of use, the installation location, the administrator information, the use history, and the error history, and to have inference failure information selectively displayed. It is also possible to have the user be able to freely input the conditions of the printing device.

What is claimed is:

1. A method of managing a printing device via a network, wherein the network connects a printing device and a management system that manages the printing device, the method comprising at the printing device side:
sending information relating to the usage status of the printing device to the management system from the printing device;
detecting a predetermined operation on the printing device;
notifying the management system of a specified notification that includes printing device identification information when the predetermined operation is detected, wherein the printing device identification information is information to identify the printing device;

the method comprising at the management system side:
storing the information sent from the printing device to an information storage unit;
extracting information relating to the printing device from the stored information based on the printing device identification information,
creating a failure inference information based on the extracted information, wherein the failure inference information indicates a deterioration of printing quality of the printing device,
creating reply information including the failure inference information in relation to the specified notification based on the extracted information, and
sending the reply information to a specified transmission destination.

2. A method in accordance with claim 1, wherein printing device management information that includes the model of the printing device which has been correlated with the printed device identification information and at least part of the printing device usage history and failure history are stored in the information storage unit.

3. A method in accordance with claim 1, wherein the sending the reply information is implemented by sending the reply information including an information for displaying the information relating to the printing device based on the extracted information and an input screen for inputting maintenance requests to the printing device.

4. A method in accordance with claim 1 further comprising:
notifying the specified notification when an operating unit of the printing device is operated.

5. A method in accordance with claim 1, wherein the printing device comprises a display unit,
the method further comprising:
sending information to be displayed on the display unit.

6. A method in accordance with claim 1 further comprising:
displaying a transmission status of the specified information in relation to the management system.

7. A method of managing a printing device via a network, the method comprising:
storing information that is transmitted from the printing device;
receiving a specified notification, wherein the specified notification includes printing device identification information that identifies the printing device;
extracting information correlating to the printing device identification information from the stored information;
creating a failure inference information based on the extracted information, wherein the failure inference information indicates a deterioration of printing quality of the printing device,
creating reply information including the failure inference information in relation to the specified notification based on the extracted information, and
sending the reply information to a specified transmission destination.

8. A service call system comprising a printing device and a management system that manages the printing device are connected to a network,
wherein the printing device comprises:
a transmission unit that transmits specified information relating to the usage status of the printing device to the management system;
a detection unit that detects a specified operation in relation to the printing device; and
a notification unit that, when this detection is made, notifies the management system of a specified notification that includes printing device identification information that identifies the printing device;

and wherein the management system comprises:
an information storage unit that stores information transmitted from the printing device;
a receiving unit that receives the specified notification;
an extraction unit that extracts information correlating to the printer device identification information from the stored information; and
a processing unit that performs a specified process in relation to the specified notification based on the extracted information,
an inference information creation unit that creates a failure inference information based on the extracted information, wherein the failure inference information indicates a deterioration of printing quality of the printing device,
a reply creating unit that creates reply information including the failure inference information in relation to the specified notification based on the extracted information, and
a sending unit that sends the reply information to a specified transmission destination.

9. A management system that manages a printing device via a network, the management system comprising:
an information storage unit that stores information that is transmitted from the printing device;
a receiving unit that receives a specified notification that includes printing device identification information that identifies the printing device;
an extraction unit that extracts information correlating to the printing device identification information from the stored information; and
a processing unit that performs a specified process in relation to the specified notification based on the extracted information,
an inference information creation unit that creates a failure inference information based on the extracted information, wherein the failure inference information indicates a deterioration of printing quality of the printing device, a reply creating unit that creates reply information including the failure inference information in relation to the specified notification based on the extracted information, and a sending unit that sends the reply information to a specified transmission destination.

10. A computer readable storage medium storing instructions for causing a computer executing the instructions perform a method for managing a printing device, the instructions comprising:

a computer program instruction of storing information transmitted from the printing device;

a computer program instruction of receiving specified notification that includes printing device identification information that identifies the printing device;

a computer program instruction of extracting information that corresponds to the printing device identification information from the stored information; and a computer program instruction of performing specified processing in relation to the specified notification based on the extracted information, a computer program instruction of creating a failure inference information based on the extracted information wherein the failure inference information indicates a deterioration of printing quality of the printing device, a computer program instruction of creating reply information including the failure inference information in relation to the specified notification based on the extracted information, and a computer program instruction of sending the reply information to a specified transmission destination.

* * * * *